US010042581B2

United States Patent
Brown et al.

(10) Patent No.: US 10,042,581 B2
(45) Date of Patent: Aug. 7, 2018

(54) RELEASING SPACE ALLOCATED TO A SPACE EFFICIENT TARGET STORAGE IN A COPY RELATIONSHIP WITH A SOURCE STORAGE

(71) Applicant: INTERNATIONAL BUSINESS MACHINES CORPORATION, Armonk, NY (US)

(72) Inventors: Theresa M. Brown, Tucson, AZ (US); Nicholas M. Clayton, Warrington (GB); Nedlaya Y. Francisco, Tucson, AZ (US); Suguang Li, Tucson, AZ (US); Mark L. Lipets, Tucson, AZ (US); Gregory E. McBride, Vail, AZ (US); Carol S. Mellgren, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 15/372,154

(22) Filed: Dec. 7, 2016

(65) Prior Publication Data
US 2018/0157423 A1    Jun. 7, 2018

(51) Int. Cl.
G06F 12/00 (2006.01)
G06F 3/06 (2006.01)

(52) U.S. Cl.
CPC ............ *G06F 3/065* (2013.01); *G06F 3/0608* (2013.01); *G06F 3/0631* (2013.01);
(Continued)

(58) Field of Classification Search
CPC ...... G06F 3/065; G06F 3/0608; G06F 3/0631; G06F 3/0644; G06F 3/0659; G06F 3/0683; G06F 3/0646; G06F 3/0647
See application file for complete search history.

(56) References Cited

U.S. PATENT DOCUMENTS 7,461,100 B2   12/2008   Spear et al.
8,285,679 B2   10/2012   Agombar et al.
(Continued)

OTHER PUBLICATIONS

C. Burger, et al., "IBM System Storage DS8000 Series: IBM FlashCopy SE", IBM Corporation, Red Paper Document REDP-4368-00, Feb. 2008, pp. 80.
(Continued)

*Primary Examiner* — Shawn X Gu
(74) *Attorney, Agent, or Firm* — David W. Victor; Konrad Raynes Davda & Victor LLP

(57) ABSTRACT

Provided are a computer program product, system, and method for releasing space allocated to a space efficient target storage in a copy relationship with a source storage. Source and target copy relationships indicate source data in the source storage to copy to target data in the target storage. The source copy relationship indicates source data that need to be copied to the target data before being updated, and the target copy relationship indicates target data tracks updated with data copied from corresponding source data. An operation is initiated that results in terminating the source and target copy relationships. Space allocated to the target data for the source and target copy relationships is released in response to determining that the target storage comprises the space efficient storage. The source and target copy relationships are removed.

20 Claims, 5 Drawing Sheets

(52) U.S. Cl.
CPC .......... *G06F 3/0644* (2013.01); *G06F 3/0646* (2013.01); *G06F 3/0647* (2013.01); *G06F 3/0659* (2013.01); *G06F 3/0683* (2013.01)

(56) References Cited

U.S. PATENT DOCUMENTS

| | | | |
|---|---|---|---|
| 8,555,010 | B2 | 10/2013 | Yuhara et al. |
| 8,606,767 | B2 | 12/2013 | Brown et al. |
| 8,706,999 | B2 | 4/2014 | Agombar et al. |
| 9,075,723 | B2 | 7/2015 | Benhase et al. |
| 9,086,818 | B2 | 7/2015 | Benhase et al. |
| 2007/0198790 | A1* | 8/2007 | Asano .................. G06F 3/0605 711/162 |
| 2014/0208051 | A1 | 7/2014 | Agombar et al. |
| 2015/0143168 | A1 | 5/2015 | Beeken |
| 2015/0286429 | A1 | 10/2015 | Dain et al. |

OTHER PUBLICATIONS

B. Dufrasne, et al., "DS8000 Thin Provisioning", IBM Corporation, Red Paper Document REDP-4554-01, Jul. 2014, pp. 122.

"FlashCopy mappings", [online][retrieved Nov. 26, 2016] http://publib.boulder.ibm.com/infocenter/flexsys/information/topic/com . . . , pp. 5.

"DFSMS Advanced Copy Services", IBM Corporation, Document No. SC35-0428-19, 2011, pp. 814.

J. Tate, et al., "IBM System Storage SAN Volume Controllerand Storwize V7000 Replication Family Services", IBM Corporation, Document No. SG24-7574-02, Mar. 2013, pp. 538.

"Incremental FlaschCopy", IBM Corporation, [online][retrieved Nov. 23, 2016] http://www.ibm.com/support/knowledgecenter/SSLTBW_2.1.0/com.ibm.z . . . , pp. 3.

U.S. Appl. No. 15/372,192, filed Dec. 7, 2016.
U.S. Appl. No. 15/372,163, filed Dec. 7, 2016.

* cited by examiner

RELEASING SPACE ALLOCATED TO A SPACE EFFICIENT TARGET STORAGE IN A COPY RELATIONSHIP WITH A SOURCE STORAGE

BACKGROUND OF THE INVENTION

1. Field of the Invention

The present invention relates to a computer program product, system, and method for releasing space allocated to a space efficient target storage in a copy relationship with a source storage.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

In a space efficient volume, volumes are thinly provisioned which means that physical storage space is not allocated to the volumes until a write to the volumes requires the space. The amount of space that is allocated is based on the amount of data that is written to the volume. In space efficient volumes, the device capacity for the devices assigned to the repository pool exceeds the physical addresses allocated to the volumes.

In space efficient volumes, when a point-in-time copy operation is performed, physical storage space is allocated only when a write operation is performed as part of the copying of the point-in-time data from the source storage to the target storage so that data is allocated to the target storage when needed for a specific transfer that is occurring.

When withdrawing point-in-time copy relationships, if the customer does not specify to release space as part of the withdrawal operation, the space allocated to a space efficient, i.e., thinly provisioned, target volume/dataset will remain allocated. If the copying of all the source tracks to the target tracks has not completed for the copy relationship, then the target volume/dataset is not useable (even though the space is still allocated).

The IBM FlashCopy® point-in-time copy functions provide a Fast Reverse Restore operation, which copies the target tracks to which the source tracks were copied in a FlashCopy pair back to the source tracks from which they were copied when a Fast Reverse Restore relationship is enabled. The Fast Reverse Restore operation may be performed after a planned or unplanned outage.

There is a need in the art for improved techniques for managing space-efficient target volumes in a point-in-time copy relationship when the copy relationship is terminated.

SUMMARY

Provided are a computer program product, system, and method for releasing space allocated to a space efficient target storage in a copy relationship with a source storage. Source and target copy relationships indicate source data in the source storage to copy to target data in the target storage. The source copy relationship indicates source data that need to be copied to the target data before being updated, and the target copy relationship indicates target data tracks updated with data copied from corresponding source data. An operation is initiated that results in terminating the source and target copy relationships. A determination is made as to whether the target storage comprises a space efficient storage in response to initiating the operation that results in terminating the source and target copy relationships. In the space efficient storage, physical storage space is allocated to the target data when required to store data submitted to the source data. Space allocated to the target data for the source and target copy relationships is released in response to determining that the target storage comprises the space efficient storage. The source and target copy relationships are removed.

DETAILED DESCRIPTION

When a point-in-time copy relationship is terminated or withdrawn as a result of an explicit withdrawal command or as a result of a restore operation, space allocated to a space efficient, e.g., thinly provisioned, source volume may remain provisioned after the copy relationship is ended. Further, if not all the data from the source volume in the copy relationship was copied over to the target volume, than the copy at the target volume may not be usable, and the space allocated to store that partial copy of the source volume on the target may be otherwise unusable and unavailable to assign to other space-efficient volumes in the target storage. The target volume may only include a partial copy of the source volume if the copy relationship was established with a parameter specifying that there is no background copy of all the source data, such that only source data that is updated is copied over to the target volume before it is updated.

Described embodiments provide techniques to automatically release the storage space allocated to a target volume in a copy relationship by performing operations to release the space allocated to the target volume when initiating an operation that will result in termination of the copy relationship when the target storage having the target data for the copy relationship to be terminated comprises space efficient storage.

Figure 1:
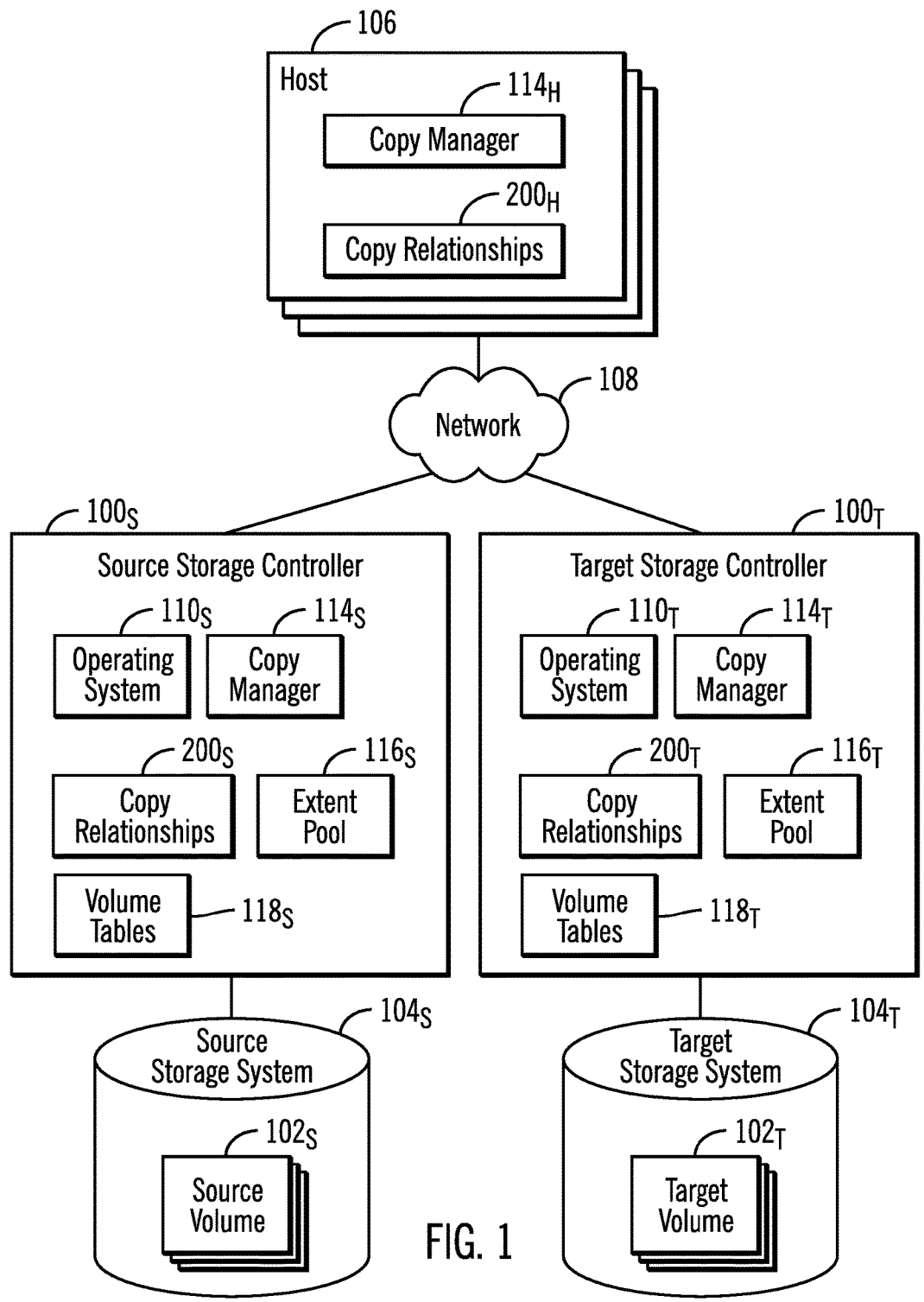
FIG. 1 illustrates an embodiment of a storage environment.

FIG. 1 illustrates an embodiment of a data storage environment having a source $100_S$ and target $100_T$ storage controllers managing access to source $102_S$ and target $102_T$ volumes configured in a source $104_S$ and target $104_T$ storage system, respectively. Host systems 106 perform read and write operations with respect to the volumes 102 over a network 108. The source $100_S$ and target $100_T$ storage controllers each respectively include an operating system $110_S$, $110_T$ to manage I/O requests from the host systems 106 with respect to the volumes $102_S$, $102_T$. The operating system $110_S$, $110_T$ may configure the volumes $102_S$, $102_T$ in the storages $104_S$, $104_T$, where data is stored in data units, such as tracks, logical block addresses (LBAs), extents, etc. An extent comprises a grouping of tracks, blocks or other data units that is assigned to volumes $102_S$, $102_T$.

The storage systems $104_S$, $104_T$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $102_S$, $102_T$ may further be configured from an array of devices, such as Just a Bunch of Disks (JBOD), Direct Access Storage Device (DASD), Redundant Array of Independent Disks (RAID) array, virtualization device, etc. Further, the storages $104_S$, $104_T$ may comprise heterogeneous storage devices from different vendors and different types of storage devices, such as a first type of storage devices, e.g., hard disk drives, that have a slower data transfer rate than a second type of storage devices, e.g., SSDs.

The network 108 may comprise a network such as one or more interconnected Local Area Networks (LAN), Storage Area Networks (SAN), Wide Area Network (WAN), peer-to-peer network, wireless network, etc.

The host 106 includes a copy manager program $114_H$ to generate requests to create point-in-time copies of source volumes $102_S$ to target volumes $102_T$ by submitting a point-in-time copy establish request to the source $114_S$ and target $114_T$ copy managers at the storage controllers $100_S$, $100_T$. The point-in-time copies are defined in copy relationships $200_H$, $200_S$, $200_T$, maintained in the host 106 and storage controllers $100_S$, $100_T$.

The storage controllers $100_S$, $100_T$ include point-in-time copy managers $114_S$, $114_T$ to create point-in-time copies of the source data $102_S$, e.g., FlashCopy, snapshot, etc., in response to PiT copy establish requests from the host system 106 copy manager $114_H$. When creating a PiT copy, the source storage controller copy manager $114_S$ generates PiT copy information in a copy relationships $200_S$ on the PiT copy created as of a point-in-time and the target copy manager $114_T$ creates corresponding target copy relationship $200_T$ for the target of the copy relationship $200_S$, $200_T$. Thus, a source $200_S$ and target $200_T$ copy relationship pair are created for a point-in-time copy to establish.

The copy managers $114_S$, $114_T$ perform a PiT copy operation that replicates data in a manner that appears instantaneous and allows processes to continue accessing the source volume $102_S$ while actual data transfers to the copy volume are deferred to a later time, such as when the source data $102_S$ is updated. The point-in-time copy appears instantaneous because the storage controller copy manager $114_S$ returns I/O complete to the host PiT copy establish request in response to generating the relationship data structures without copying the data.

In certain embodiments, the operating systems $110_S$, $110_T$ may manage volumes $102_S$, $102_T$ as space efficient volumes, where the volumes $102_S$, $102_T$ are configured without allocating actual storage space in the storage system 104 until the space is needed for data written to the volumes $102_S$, $102_T$. In this way the volumes are "thin provisioned" because space is not allocated until needed for write data. Volumes $102_S$, $102_T$ configured as space efficient volumes are initially virtual volumes because space in the storage system $104_S$, $104_T$ has not yet been allocated.

The operating systems $110_S$, $110_T$ each maintain an extent pool $116_S$, $116_T$ of free extents of tracks available to assign to the volumes $102_S$, $102_T$ configured as thin-provisioned or space efficient volumes when space is needed.

The operating systems $110_S$, $110_T$ each respectively maintain volume tables $118_S$, $118_T$ providing information on the configured volumes $102_S$, $102_T$, including a mapping of logical to physical addresses. When a space efficient volume $102_S$, $102_T$ is first provisioned, all the logical addresses are defined in the volume table $118_S$, $118_T$, but the mapping of physical storage space in the storage system $104_S$, $104_T$ to the logical addresses is not yet provisioned until a write occurs to the logical addresses.

Figure 2:
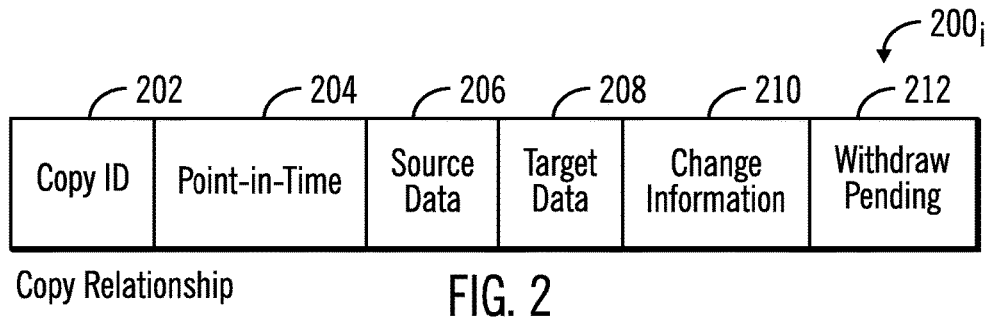
FIG. 2 illustrates an embodiment of a copy relationship.

FIG. 2 illustrates an instance of a copy relationship $200_i$, such as copy relationships $200_S$, $200_T$, and $200_H$. A PiT copy relationship instance $200_i$ may include a PiT copy identifier 202 identifying the PiT copy created by the copy manager $114_i$ (i.e., $114_H$, $114_S$, $114_T$) at the storage controller 100; a point-in-time 204 of the PiT copy 202, which may mean that data is consistent as of that point-in-time 204; source data 206, e.g., source volume $102_S$, from which data is copied; target data 208, e.g., target volume $102_T$, to which the PiT data is copied; change information 210 indicating which data or tracks in the source data 206 has changed since the point-in-time 204 and while the PiT copy 202 was open; and a withdraw pending flag 212 indicating whether a withdrawal operation is in-progress of being performed to terminate the copy relationship $200_i$. The change information 210 may comprise a bitmap having a bit for each data unit (e.g., track) that is set to one of two values indicating the data or track represented by the bit has or has not been updated since the point-in-time 204. Initially, the change information 210 for all the source data is set to indicate not copied or changed, and then a bit is reset when the track or data unit represented by the change information 210 is copied from the source storage to the target storage. The source 206 and target 208 data may comprise a volume, a subset of a volume or other unit of data.

When establishing a copy relationship between a source volume $102_S$ and a target volume $102_T$, a pair of copy relationships $200_S$, $200_T$ are created each indicating the same point-in-time 204, source data (e.g., source volume) 206, and target data 208 (e.g., target volume). The change information 210 for the source copy relationship $200_S$ may indicate source data or tracks in the source data 206 that have not been copied over to the target data 208. The source change information $210_S$ may initially indicate that all tracks or data units in the source data unit 206 need to be copied, the change information 210 for a track or data unit is changed when the source data or source track as of the point-in-time is copied over before the update to the source track. The target change information $210_T$ in the target copy relationship $200_T$ identifies each target track or data unit in the target data 208 that has a copy of the source data before being updated.

In described embodiments, the target data or volume 208 may comprise a space efficient storage or volume, such as a thinly provisioned volume where extents of data from the extent pool $116_T$ are only provisioned when needed for data being copied from the source tracks 206. Further, in certain embodiments, the copy relationship may comprise a "no copy" copy relationship where all the source data 206 is not copied to the target data 208 as part of a background copy operation. Instead, the source data as of the point-in-time is only copied before being changed by a write to the source data 208.

Figure 3:
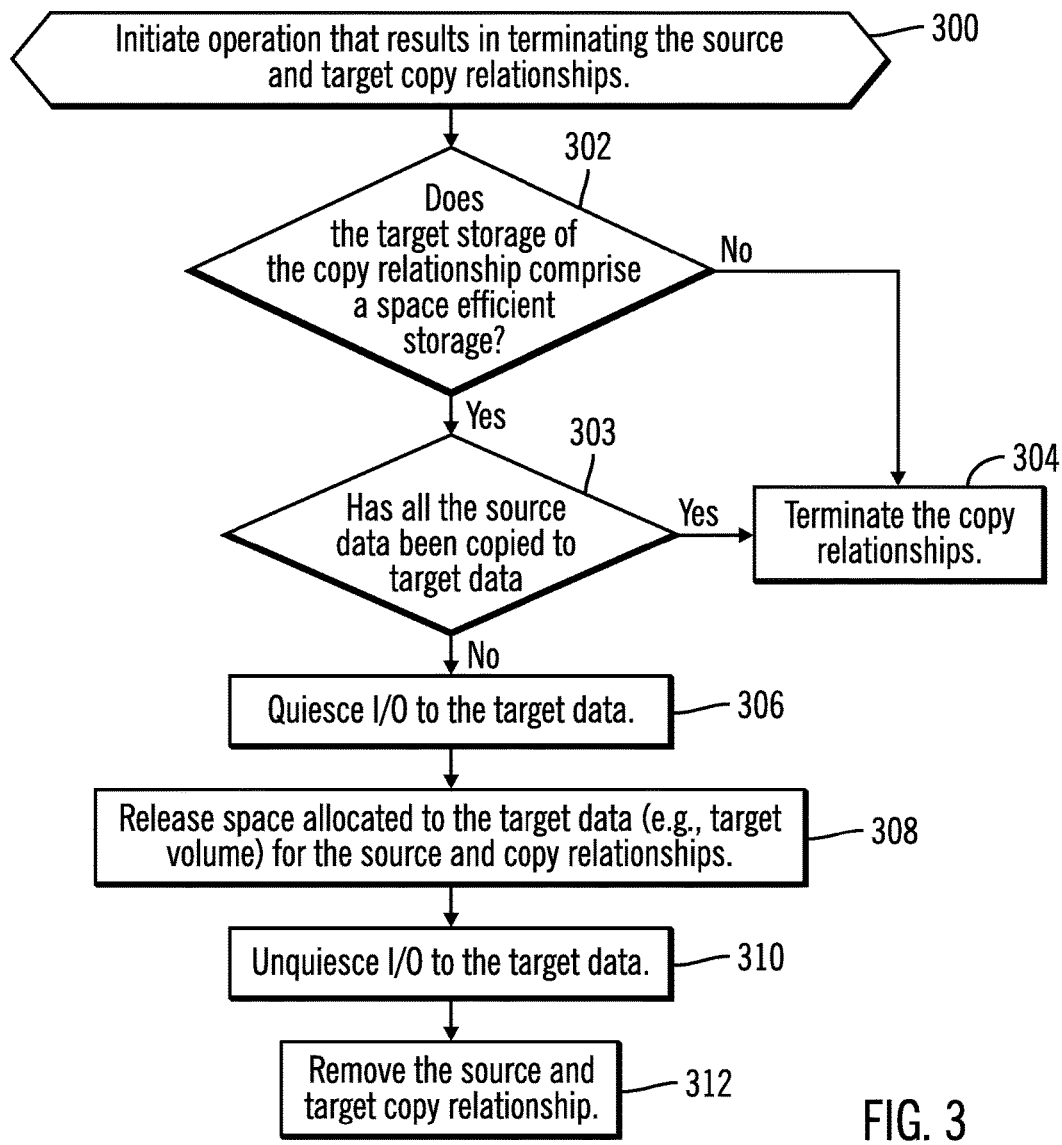
FIG. 3 illustrates an embodiment of operations that result in terminating source and target copy relationships.

FIG. 3 illustrates an embodiment of operations performed by at least one of the copy managers $114_i$, such as at least one of $114_H$, $114_S$, $114_T$, to release extents allocated to the space efficient target volume $102_T$ in a copy relationship pair $200_S$, $200_T$ for one copy relationship being terminated. Upon initiating an operation to terminate the source and target copy relationship pair $200_S$, $200_T$, the copy manager $114_i$ determines (at block 302) whether the target data 208 comprises a space efficient storage, such as a space efficient or thin volume. If (at block 302) the target storage $104_T$ including the target data 208 (volume) is space efficient, then a determination is made (at block 303) whether all the source data 206 has been copied to the target data 208. If not, then Input/Output (I/O) requests to the target data 208 are quiesced (at block 306), such as by the target operating system $110_T$, and the space, such as extents, allocated to the target data 208 for the source and copy relationships, are released (at block 308), and returned to the target extent pool $116_T$, where they are available for further allocation to a space efficient target volume $102_T$. After releasing the space, I/O is unquiesced (at block 310) to allow writes to proceed to the target data 208 and the source $200_S$ and target $200_T$ copy relationships are removed (at block 312). If (at block 302) the target storage $104_T$ is not space efficient or if (at block 303) all the source data 206 has been copied to target data 208, then the copy relationships $200_S$, $200_T$ are terminated and removed (at block 304).

Figure 4:
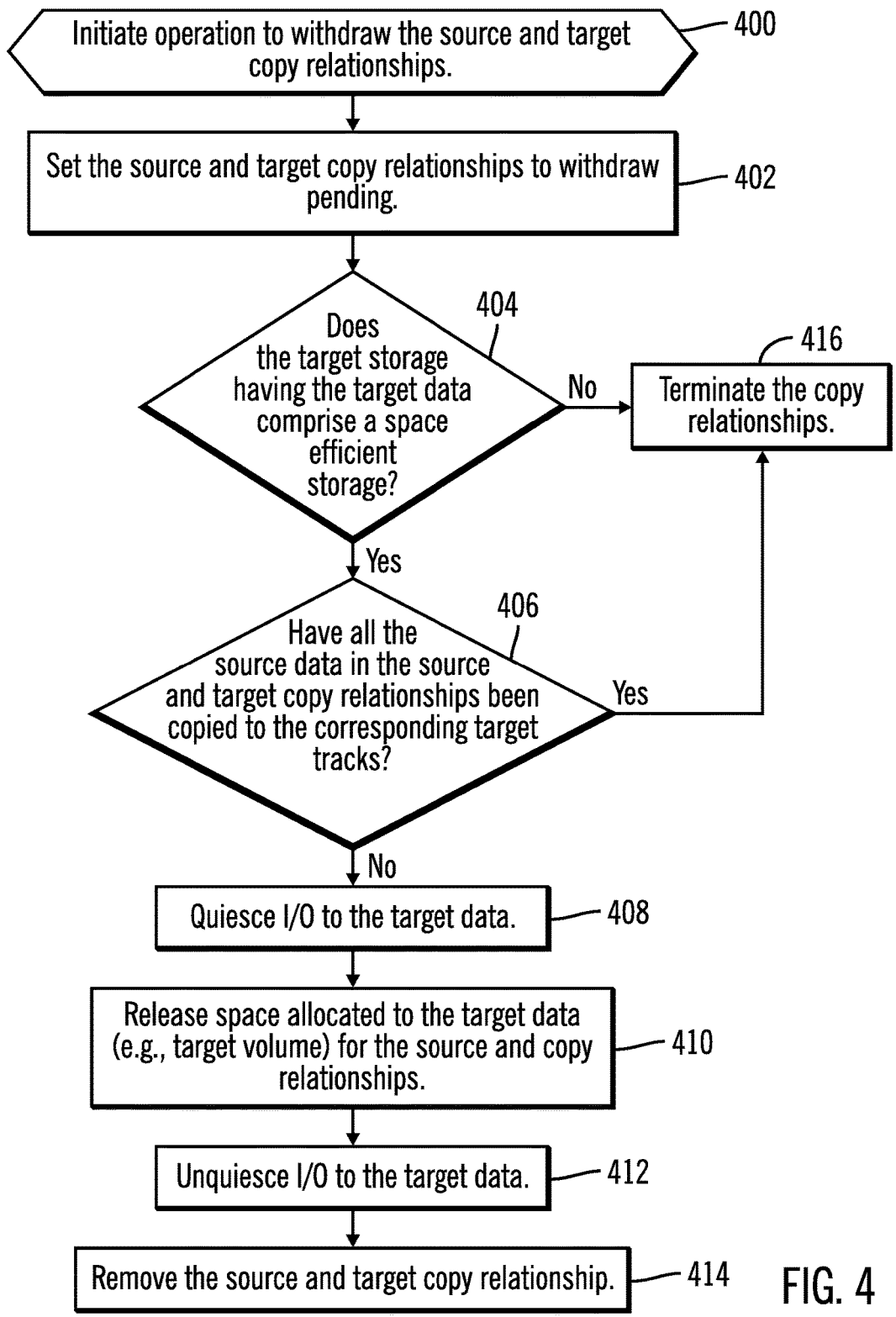
FIG. 4 illustrates an embodiment of operations to withdraw source and target copy relationships for a copy relationship pair.

FIG. 4 illustrates an embodiment of operations performed by the at least one of the copy managers $114_i$, e.g., $114_H$, $114_S$, $114_T$, to withdraw a copy relationship. Upon initiating (at block 400) operation to withdraw a source $200_S$ and target $200_T$ copy relationship pair, the withdraw pending 212 flags in the copy relationship pairs $200_S$, $200_T$ to remove are set (at block 402) to indicate withdraw pending. If (at block 404) the target storage $104_T$ having the target data 208, e.g., target volume $102_T$, comprises a space efficient storage, then a determination is made (at block 406) if all the source data 206 in the source $200_S$ and target $200_T$ copy relationship has been copied to corresponding target data, e.g., tracks. This may be determined by checking whether the target change information $210_T$ indicates that not all of the target data units have received data from the corresponding source data units, e.g., tracks, which may occur when the copy relationships $200_S$ and $200_T$ are "no copy" background relationships where the source data 206 is not copied in full in the background to the target data 208.

If (at block 406) not all the source data 206, as of the point-in-time 204, has been copied over, then I/O to the target data 208 is quiesced (at block 408) and the space, i.e., extents, allocated to the target data 208 for the source and copy relationships $200_S$, $200_T$ are released and returned to the target extent pool $116_T$. After releasing the space, I/O is unquiesced (at block 412) to allow writes to proceed to the target data, and the source $200_S$ and target $200_T$ copy relationships are removed (at block 414). If (from the no branch at block 404) the target storage $104_T$ does not comprise space efficient storage or if (from the yes branch at block 406) all the source data 206 has been copied to the target data 208, then the copy relationships $200_S$ and $200_T$ are terminated (at block 416).

With the operations of FIG. 4, the space allocated to a space efficient target volume is automatically released when withdrawing the copy relationships when the target data 208 does not include a full copy of the source data 206. If the target data does not include a full copy, then it is not useful to retain the partial copy of the source data at the target data 208, and the extents used for the target data are released to make available for other space efficient volumes at the target storage $104_T$.

Figure 5:
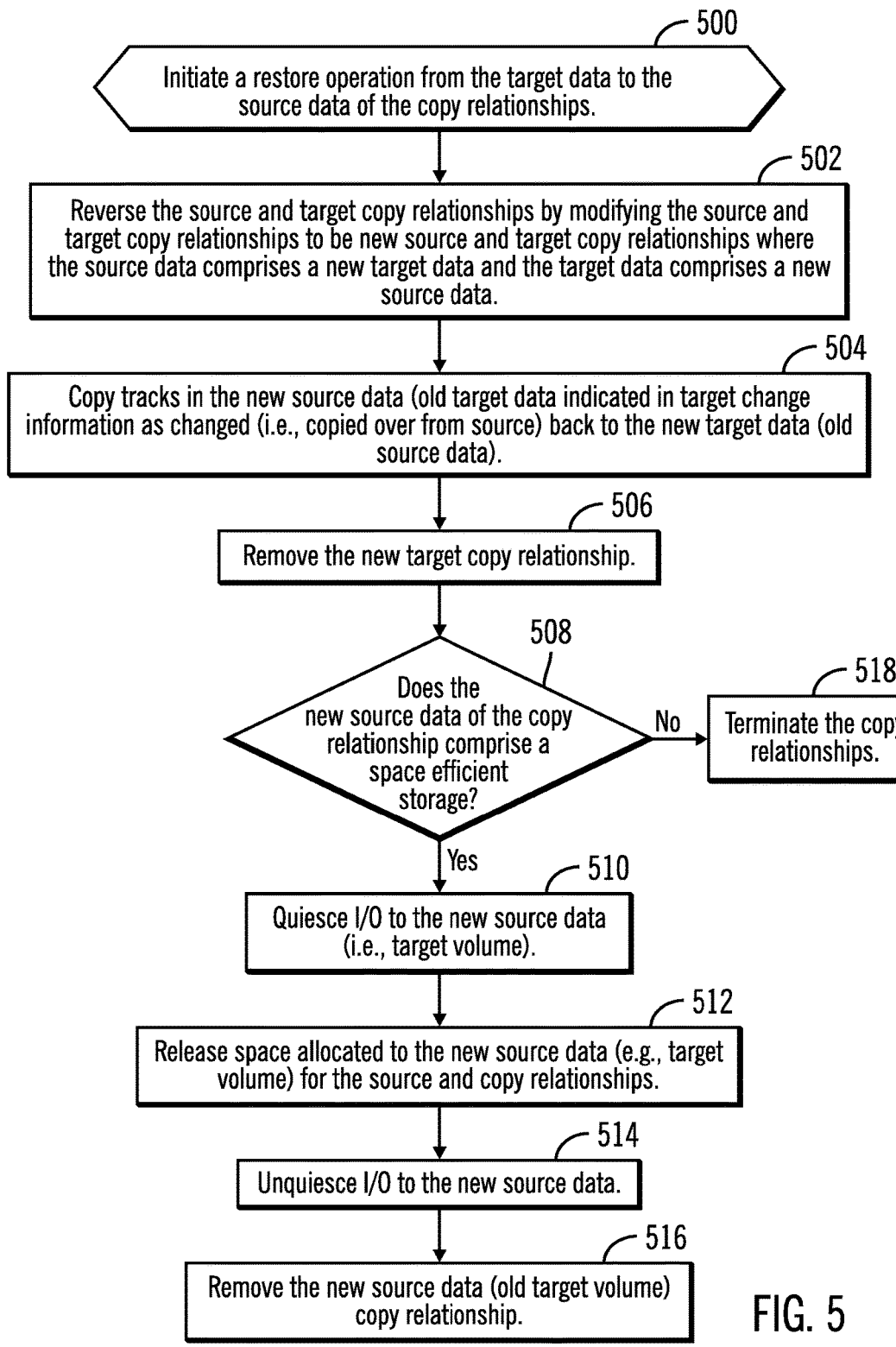
FIG. 5 illustrates an embodiment of operations to restore source data from target data in a point-in-time copy relationship.

FIG. 5 illustrates an embodiment of operations performed by the at least one of the copy managers $114_i$, i.e., $114_H$, $114_S$, $114_T$, to perform a restore to the source data $102_S$ (e.g., volume) from the target data $102_T$ (e.g., volume) in a copy relationship pair $200_S$, $200_T$. The restore operation may be performed when information on changes to the target data $102_T$ is recorded in target change information $210_T$ and there is no background copy. The restore operation may be performed after a planned or unplanned outage at the source $100_S$. Upon initiating (at block 500) a restore operation from the target data 208 to the source data 206 of a copy relationship pair $200_S$, $200_T$, the copy manager $114_S$, $114_T$ reverses (at block 502) the source $200_S$ and target $200_T$ copy relationships by modifying the source $200_S$ and target $200_T$ copy relationships to produce new source $102_S'$ and new target $102_T'$ copy relationships where the source data comprises new target data and the target data comprises a new source data. The copy manager $114_T$ copies (at block 504) tracks in the new source data $102_S'$ (old target data $102_T$ indicated in target change information 210 as changed, i.e., copied over from the source) back to the new target data $102_T'$ (old source data $102_S$). In this way, the source data $102_S$ is restored to the point-in-time 204 state. After copying the target tracks back to the source data $102_S$ the new target copy relationship $200_T'$ (from the new source data to new target data) is removed (at block 506).

If (at block 508) the new source storage, i.e., target storage $102_T$, of the copy relationship pair comprise a space efficient storage, then the copy manager $114_T$ quiesces (at block 510) I/O to the new source storage (e.g., new source (target) volume $102_T$) and the space, i.e., extents, allocated to the target data 208 for the source and copy relationships $200_S$, $200_T$ is released (at block 512) and returned to the target extent pool $116_T$. After releasing the space, I/O is unquiesced (at block 514) to allow writes to proceed to the new source (target) data, and the new source $200_S'$ (modified old target copy relationship $200_T$) is removed (at block 516). If (at block 508) the new source target storage $104_T$ is not a space efficient storage, then the copy relationships $200_S$, $200_T$ are terminated.

With the operations of FIG. 5, if a restore is performed from a target storage that comprises a space efficient storage, then after copying back the target data, comprising source data copied over as of the point-in-time of the copy relationship, to the source data, the space allocated to the space efficient target storage may be released and returned to an extent pool. Described embodiments allow the space allocated to the target data to be returned to the extent pool to be available for further provisioning in the case that the source data is restored from the target data to be at the point-in-time of the copy relationships.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
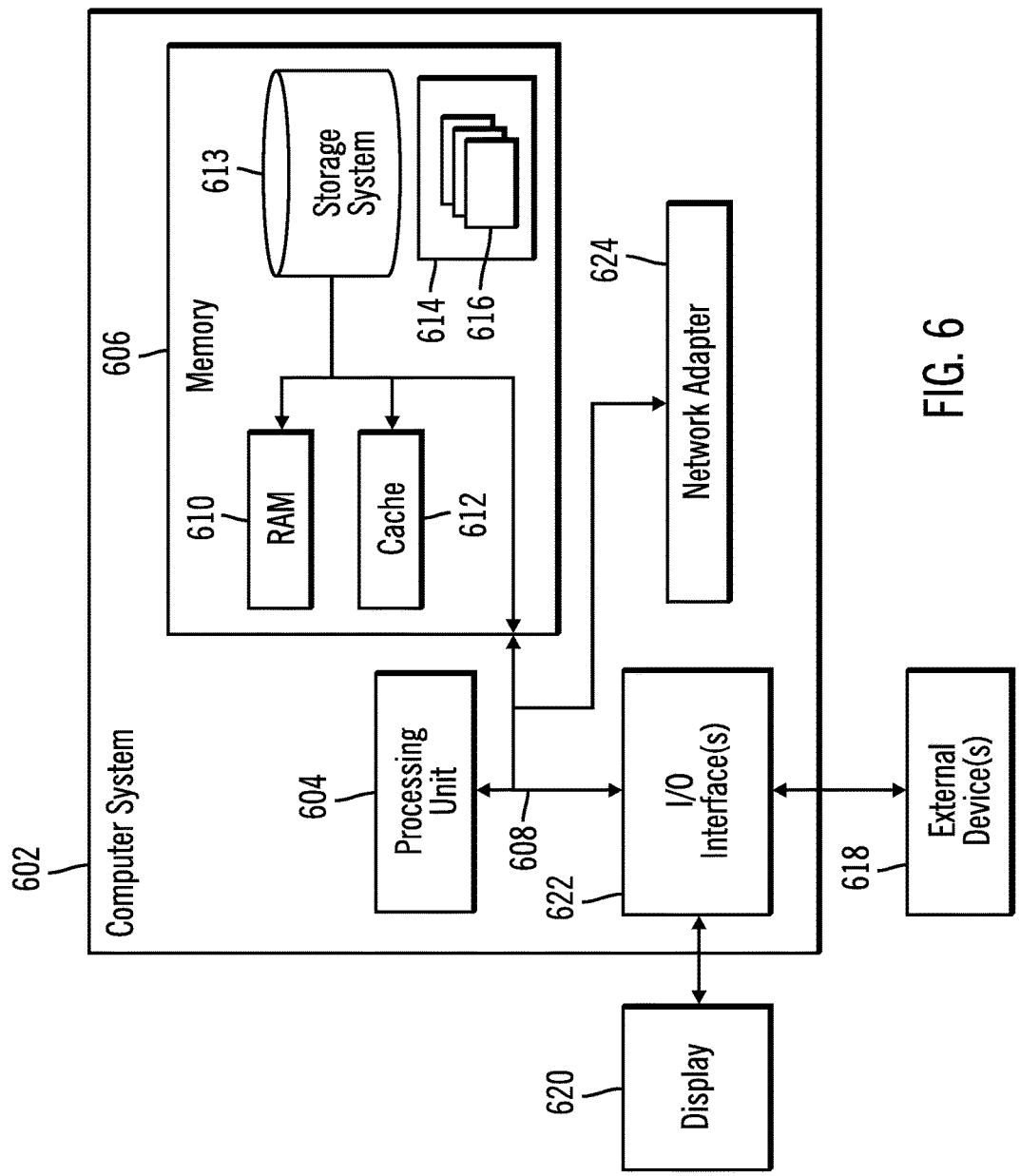
FIG. 6 illustrates a computing environment in which the components of FIG. 1 may be implemented.

The computational components of FIG. 1, including the storage controllers $100_S$, $100_T$ and host 106 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing copy relationships between a source storage and a target storage, wherein the computer program product comprises a computer readable storage medium having program instructions embodied therewith, the program instructions executable by a processor to cause operations, the operations comprising:
    providing a source and target copy relationships indicating source data in the source storage to copy to target data in the target storage, wherein the source copy relationship indicates source data that needs to be copied to the target data before being updated, and wherein the target copy relationship indicates target data tracks updated with data copied from corresponding source data;
    initiating an operation that results in terminating the source and target copy relationships;
    determining whether the target storage comprises a space efficient storage in response to initiating the operation that results in terminating the source and target copy relationships, wherein in the space efficient storage, physical storage space is allocated to the target data when required to store data submitted to the source data;
    releasing space allocated to the target data for the source and target copy relationships in response to determining that the target storage comprises the space efficient storage; and
    removing the source and target copy relationships.

2. The computer program product of claim 1, wherein the initiating the operation that results in terminating comprises initiating an operation to withdraw the source and target copy relationships, wherein the operations further comprise:
    determining whether all the source data in the source and target copy relationships has been copied to the target data in response to initiating the operation to withdraw the source and target copy relationships, wherein the releasing the space is performed in response to determining both that not all the source data in the source and target copy relationships has been copied to the target data and that the target storage comprises the space efficient storage.

3. The computer program product of claim 2, wherein the source and target copy relationships are removed in response to the releasing the space allocated to the target storage.

4. The computer program product of claim 2, wherein the operations further comprise:
    quiescing input/output (I/O) operations to the target data in response to determining that the target storage comprises the space efficient storage, wherein the releasing the space allocated to the target data is performed in response to quiescing the I/O operations;
    unquiescing I/O operations to allow I/O operations to proceed to the target data in response to releasing the space allocated to the target data; and
    removing the source and target copy relationships in response to unquiescing the I/O operations.

5. The computer program product of claim 1, wherein the initiating the operation that results in terminating comprises a restore operation, wherein the operations further comprise:
    copying data in target data to which data from the source data was copied, according to the target copy relationship, back to the source data from which the data was copied, wherein the determining whether the target storage comprises the space efficient storage is performed in response to completing the copying the data in the target data to the source data from which the data was copied.

6. The computer program product of claim 5, wherein the operations further comprise:
    reversing the source and target copy relationships by modifying the source and target copy relationships to be new source and target copy relationships where the source storage comprises a new target storage and the target storage comprises a new source storage, wherein the copying of the target data to the source data is performed as part of the new source and new target copy relationships.

7. The computer program product of claim 6, further comprising:
    removing the new target copy relationship, wherein the determining whether the target storage comprises the space efficient storage and releasing space allocated to the new source storage are performed after removing the new target copy relationship; and
    removing the new source copy relationship after releasing the space allocated to the target storage.

8. The computer program product of claim 7, wherein the operations further comprise:
    quiescing Input/Output (I/O) operations to the target data in response to removing the new target copy relationship, wherein the space allocated to the target data is released in response to quiescing the I/O operations; and
    unquiescing I/O operations to the target data in response to releasing the space allocated to the target data, wherein the new source copy relationship is removed after the unquiescing the I/O operations.

9. A system for managing copy relationships between a source storage and a target storage, comprising:
    a processor; and
    a computer readable storage medium having program instructions executed by the processor to cause operations, the operations comprising:
        providing a source and target copy relationships indicating source data in the source storage to copy to target data in the target storage, wherein the source copy relationship indicates source data that needs to be copied to the target data before being updated, and wherein the target copy relationship indicates target data tracks updated with data copied from corresponding source data;
        initiating an operation that results in terminating the source and target copy relationships;
        determining whether the target storage comprises a space efficient storage in response to initiating the operation that results in terminating the source and target copy relationships, wherein in the space efficient storage, physical storage space is allocated to the target data when required to store data submitted to the source data;
releasing space allocated to the target data for the source and target copy relationships in response to determining that the target storage comprises the space efficient storage; and
removing the source and target copy relationships.

10. The system of claim 9, wherein the initiating the operation that results in terminating comprises initiating an operation to withdraw the source and target copy relationships, wherein the operations further comprise:
determining whether all the source data in the source and target copy relationships has been copied to the target data in response to initiating the operation to withdraw the source and target copy relationships, wherein the releasing the space is performed in response to determining both that not all the source data in the source and target copy relationships has been copied to the target data and that the target storage comprises the space efficient storage.

11. The system of claim 10, wherein the source and target copy relationships are removed in response to the releasing the space allocated to the target storage.

12. The system of claim 9, wherein the initiating the operation that results in terminating comprises a restore operation, wherein the operations further comprise:
copying data in target data to which data from the source data was copied, according to the target copy relationship, back to the source data from which the data was copied, wherein the determining whether the target storage comprises the space efficient storage is performed in response to completing the copying the data in the target data to the source data from which the data was copied.

13. The system of claim 12, wherein the operations further comprise:
reversing the source and target copy relationships by modifying the source and target copy relationships to be new source and target copy relationships where the source storage comprises a new target storage and the target storage comprises a new source storage, wherein the copying of the target data to the source data is performed as part of the new source and new target copy relationships.

14. The system of claim 13, further comprising:
removing the new target copy relationship, wherein the determining whether the target storage comprises the space efficient storage and releasing space allocated to the new source storage are performed after removing the new target copy relationship; and
removing the new source copy relationship after releasing the space allocated to the target storage.

15. A method for managing copy relationships between a source storage and a target storage, comprising:
providing a source and target copy relationships indicating source data in the source storage to copy to target data in the target storage, wherein the source copy relationship indicates source data that needs to be copied to the target data before being updated, and wherein the target copy relationship indicates target data tracks updated with data copied from corresponding source data;
initiating an operation that results in terminating the source and target copy relationships;
determining whether the target storage comprises a space efficient storage in response to initiating the operation that results in terminating the source and target copy relationships, wherein in the space efficient storage, physical storage space is allocated to the target data when required to store data submitted to the source data;
releasing space allocated to the target data for the source and target copy relationships in response to determining that the target storage comprises the space efficient storage; and
removing the source and target copy relationships.

16. The method of claim 15, wherein the initiating the operation comprises initiating an operation to withdraw the source and target copy relationships, further comprising:
determining whether all the source data in the source and target copy relationships has been copied to the target data in response to initiating the operation to withdraw the source and target copy relationships, wherein the releasing the space is performed in response to determining both that not all the source data in the source and target copy relationships has been copied to the target data and that the target storage comprises the space efficient storage.

17. The method of claim 16, wherein the source and target copy relationships are removed in response to the releasing the space allocated to the target storage.

18. The method of claim 15, wherein the initiating the operation comprises a restore operation, further comprising:
copying data in target data to which data from the source data was copied, according to the target copy relationship, back to the source data from which the data was copied, wherein the determining whether the target storage comprises the space efficient storage is performed in response to completing the copying the data in the target data to the source data from which the data was copied.

19. The method of claim 18, further comprising:
reversing the source and target copy relationships by modifying the source and target copy relationships to be new source and target copy relationships where the source storage comprises a new target storage and the target storage comprises a new source storage, wherein the copying of the target data to the source data is performed as part of the new source and new target copy relationships.

20. The method of claim 19, further comprising:
removing the new target copy relationship, wherein the determining whether the target storage comprises the space efficient storage and releasing space allocated to the new source storage are performed after removing the new target copy relationship; and
removing the new source copy relationship after releasing the space allocated to the target storage.

* * * * *

UNITED STATES PATENT AND TRADEMARK OFFICE
CERTIFICATE OF CORRECTION

PATENT NO. : 10,042,581 B2  
APPLICATION NO. : 15/372154  
DATED : August 7, 2018  
INVENTOR(S) : Theresa M. Brown et al.

Page 1 of 1

It is certified that error appears in the above-identified patent and that said Letters Patent is hereby corrected as shown below:

On the Title Page

Item (72) Inventors should be corrected to read: Theresa M. Brown, Tucson, AZ, (US); Nicolas M. Clayton, Warrington (GB); Nedlaya Y. Francisco, Tucson, AZ (US); Suguang Li, Tucson, AZ, (US); Mark L. Lipets, Tucson, AZ, (US); Gregory E. McBride, Vail, AZ, (US); Carol S. Mellgren, Tucson, AZ, (US); Raul E. Saba, Tucson, AZ, (US);

Signed and Sealed this  
Twenty-fifth Day of February, 2020

Andrei Iancu  
*Director of the United States Patent and Trademark Office*